(12) United States Patent
Carr et al.

(10) Patent No.: US 6,765,680 B2
(45) Date of Patent: Jul. 20, 2004

(54) METHODS OF TESTING AND MANUFACTURING MICRO-ELECTRICAL MECHANICAL MIRRORS

(75) Inventors: Charles D. Carr, Orefield, PA (US); Zhencan Fan, Andover, MA (US); Lu Fang, Lehigh, PA (US); Michael Hahn, Allentown, PA (US); Xiaoqing Yin, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 197 days.

(21) Appl. No.: 10/176,773

(22) Filed: Jun. 21, 2002

(65) Prior Publication Data

US 2003/0234934 A1 Dec. 25, 2003

(51) Int. Cl.[7] ................................................. G01B 9/02
(52) U.S. Cl. ...................................... 356/510; 356/511
(58) Field of Search .................................. 356/450, 511, 356/510

(56) References Cited

U.S. PATENT DOCUMENTS 5,291,333 A * 3/1994 Mills et al. ................. 359/601

* cited by examiner

*Primary Examiner*—Frank G. Font
*Assistant Examiner*—Andrew H. Lee

(57) ABSTRACT

The present invention provides a method of testing micro-electrical mechanical mirrors including simultaneously applying a voltage to each of a plurality of such mirrors to tilt each of the plurality to a deflection angle, and simultaneously deflecting a beam from each of the plurality using an interferometer to simultaneously determine an accuracy of the deflection angle of each of the plurality. In addition, a method of manufacturing micro-electrical mechanical mirrors is also disclosed.

10 Claims, 3 Drawing Sheets

METHODS OF TESTING AND MANUFACTURING MICRO-ELECTRICAL MECHANICAL MIRRORS

TECHNICAL FIELD OF THE INVENTION

The present invention is directed, in general, to optoelectronic devices and, more specifically, to methods of testing and manufacturing micro-electrical mechanical mirrors using an interferometer.

BACKGROUND OF THE INVENTION

Electrostatically actuated micro-electrical mechanical system (MEMS) devices have recently gained wide acceptance in a variety of optical communication applications. One such use is in optical switching and steering devices. In these devices, movable micro-machined mirrors are used as switching elements to direct input optical signals to desired outputs.

Looking briefly at FIG. 1, illustrated is a plan view of a mirror device 100 of a mirror array found in a conventional MEMS optical switch. As illustrated, the device 100 is comprised of a mirror 110 coupled to a gimbal 120 on a polysilicon frame 130. Typically, the illustrated components are fabricated on a substrate (not shown) by micro-machining processes such as multilayer deposition and selective etching. The mirror 110 in FIG. 1 is double-gimbal cantilevered and attached to the polysilicon frame 130. Specifically, the mirror 110 is attached to the gimbal 120 via first springs 140, thus defining a mirror axis about which the mirror 110 may be rotated. Also, the gimbal 120 is attached to the polysilicon frame 130 by second springs 150, which further define a gimbal axis about which the mirror 110 and gimbal 120 may be rotated. Through a combination of the mirror and gimbal axes, the mirror 110 may be tilted to a desired orientation for optical signal routing via application of a voltage to an electrode or similar actuation.

Typically, to accomplish such rotation, electrodes (not illustrated) are positioned under both the mirror 110 and gimbal 120. The electrodes are configured to rotate the mirror 110 or gimbal 120 in either direction about either's respective axis. The mirror 110 or gimbal 120 rotates under the electrostatic force between the electrode and the mirror 110 or gimbal 120, and is balanced in equilibrium by the restoring force of the first and second springs 140, 150. The degree of rotation depends upon the amount of voltage applied to the electrodes. Traditionally, a degree of rotation up to about 9 degrees in either direction about either axis is achievable using a voltage of about 150 volts.

The mirrors of an optical switch are rotated to varying deflection angles by varying the amount of voltage applied to the electrodes. Conventionally, the deflection angle increases in direct proportion to the voltage being applied. An incoming optical signal reflected from the mirror 110 to an outgoing optic fiber, depending on the chosen deflection angle. As a result, if one or more mirrors within a mirror array do not achieve the deflection angle intended by a specific applied voltage, data carried within the beam may be misdirected or even completely lost.

To help alleviate the potential for such misdirected data, telecommunications manufacturers verify, or "characterize," the individual mirrors, for various applied voltages, within the optical switch before the switch is put into operation. In addition, whether the deflection angles fall within allowable tolerances may also be determined. Perhaps the most common technique used to characterize these mirrors employs the use of an infrared camera. In this technique, a beam of light is reflected off of one mirror at a time, and at one particular deflection angle at a time. The beam is reflected onto a target where the infrared camera locates the position of the reflected beam, thus indicating the current deflection angle of that mirror. Using this process, a single characterization step for a single mirror at a single applied voltage takes about 1 second, or perhaps a little faster, to perform. The process is then repeated for the same mirror, but with the deflection angle incremented by a variation in voltage. Again the camera locates the reflected beam to characterize the new deflection angle of the mirror. This process is repeated for each desired increment in deflection angle, along both rotational axes of the mirror, before the process moves on to another mirror within the optical switch. Alternatively, all the mirrors in the array may be characterized, one at a time, at the same deflection angle before that angle is collectively incremented for the entire array and the characterization process repeated.

Due to the demand for increased switching speed and switching capacity, the number of mirrors within an optical switch is growing at an astonishing rate. Where conventional switches incorporate about one thousand mirrors, manufacturers estimate future optical switches may have mirror arrays with over four thousand mirrors. If one second is required for characterization of a single mirror at each deflection angle, and if each mirror is moveable about 9 degrees in either direction and about both rotation axes, a conventional array having about 1000 mirrors may take an excessive amount of time to characterize the entire array. Using this conventional technique, future arrays having about four thousand mirrors would likely require almost seven weeks to characterize. Even if other conventional techniques significantly improve the characterization time for each individual mirror, for instance, to one-half second each, it is still little consolation to know that characterization of the area will now only take about four weeks, rather than seven.

Accordingly, what is needed in the art is a system and related method for quickly and accurately characterizing micro-electrical mechanical mirrors that does not suffer from the deficiencies found in the prior art.

SUMMARY OF THE INVENTION

To address the above-discussed deficiencies of the prior art, the present invention provides a method of testing micro-electrical mechanical mirrors. In one embodiment, the method includes simultaneously applying a voltage to each of a plurality of micro-electrical mechanical mirrors to tilt each of the plurality to a deflection angle, and simultaneously deflecting a beam from each of the plurality using an interferometer to simultaneously determine an accuracy of the deflection angle of each of the plurality.

In addition, a related method of manufacturing micro-electrical mechanical mirrors is disclosed.

BRIEF DESCRIPTION OF THE DRAWINGS

For a more complete understanding of the present invention, reference is now made to the following detailed description taken in conjunction with the accompanying FIGUREs. It is emphasized that various features may not be drawn to scale. In fact, the dimensions of the various features may be arbitrarily increased or reduced for clarity of discussion.

Reference is now made to the following descriptions taken in conjunction with the accompanying drawings, in which.

DETAILED DESCRIPTION

Figure 1:
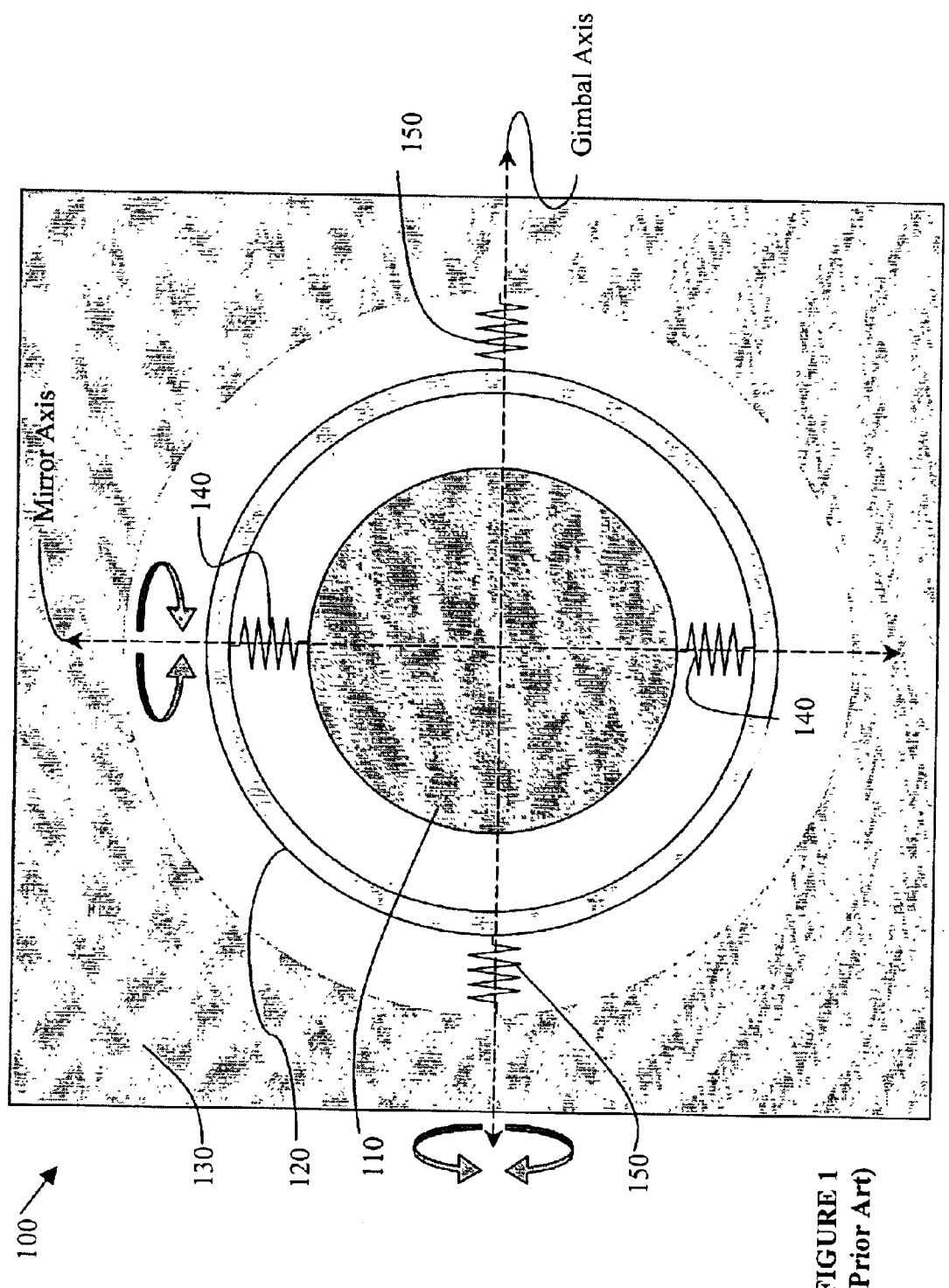
FIG. 1 illustrates a plan view of a mirror device of a mirror array found in a prior art MEMS optical switch.
Figure 2:
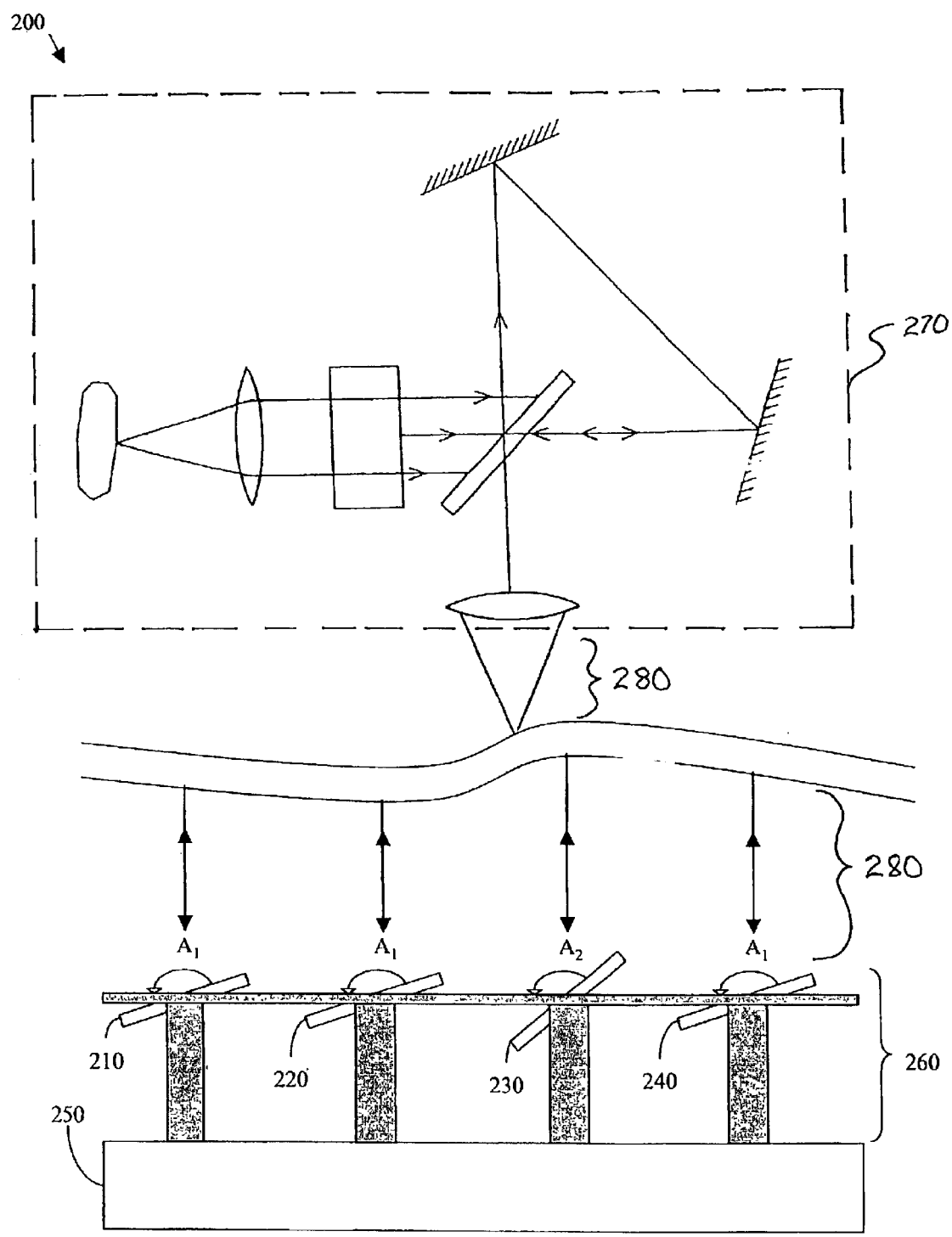
FIG. 2 illustrates a schematic view of one embodiment of a system for simultaneously testing a plurality of microelectrical mechanical devices manufactured according to the principles of the present invention.

Referring to FIG. 2, illustrated is one embodiment of a system 200 for simultaneously testing a plurality of microelectrical mechanical devices manufactured according to the principles of the present invention. For the sake of clarity, the bottom half of FIG. 2 is illustrated in an enlarged view, while the upper half of FIG. 2 is illustrated from a pulled-back view. In one embodiment, the system 200 may include first, second, third and fourth mirrors 210, 220, 230, 240 mounted on a substrate 250. Although the system 200 is illustrated as characterizing mirrors 210, 220, 230, 240 of a MEMS device, the present invention is broad enough to encompass the characterization of other types of MEMS devices or any number of such devices.

In an exemplary embodiment of the present invention, the substrate 250 is part of a MEMS optical switch (not illustrated) in which the first, second, third and fourth mirrors 210, 220, 230, 240 comprise a plurality of mirrors in a mirror array 260 that may be present in an optical switch. In such an embodiment, the mirror array 260 may be one of several arrays within the optical switch. In a related embodiment, the optical switch may be comprised of about one thousand mirrors wherein each mirror array may include about 12 mirrors. Of course, the present invention is not limited to any particular number of mirrors or mirror arrays.

As illustrated in FIG. 2, the system 200 further includes a detection instrument 270. In the illustrated advantageous embodiment, the detection instrument 270 is a commercially available optical interferometer 270, whose design and operation are well known. Although the present invention is described in terms of an interferometer 270, in alternative embodiments, the detection instrument may be any instrument or combination of instruments capable of characterizing the mirror array 260 in accordance with the principles of the present invention discussed below.

In the illustrative embodiment shown in FIG. 2, the interferometer 270 transmits a beam 280, which may be transmitted onto the mirror array 260. By transmitting the beam 280 onto the mirror array 260, in accordance with the present invention, the interferometer 270 can be used to determine deflection angles $A_1$, $A_2$, $A_3$, $A_4$ of each of the mirrors 210, 220, 230, 240 in the array 260, respectively. As discussed above, the mirrors 210, 220, 230, 240 within a MEMS optical switch ideally tilt to a particular deflection angle once a certain voltage is applied in order to facilitate switching within an optical communications switching network. To provide more accurate switching, each mirror 210, 220, 230, 240 within the array 260 should ideally provide substantially the same deflection angle when a particular voltage is applied. Similarly, when the mirrors 210, 220, 230, 240 move to a certain deflection angle, the applied voltage to all the mirrors 210, 220, 230, 240 should be substantially equal. In addition, the deflection angles $A_1$, $A_2$, $A_3$, $A_4$ should also fall within a desired tolerance to further facilitate accurate optical switching.

Therefore, in accordance with the present invention, the information provided by the interferometer 270 determines the deflection angle of each mirror 210, 220, 230, 240 when that particular voltage is applied, so-called "characterization" of the mirrors 210, 220, 230, 240. Likewise, the particular voltage required to tilt the mirrors 210, 220, 230, 240 to a desired deflection angle may also be determined by the same information, as well as whether the current angles $A_1$, $A_2$, $A_3$, $A_4$ fall within tolerance. If the determined deflection angle is outside a desired range, the manufacturing process used to construct the mirrors 210, 220, 230, 240 may be altered to achieve a deflection angle for each mirror 210, 220, 230, 240 that falls within the desired range. Moreover, those MEMS devices that fall outside of the range may be discarded to assure a higher manufacturing quality.

For example, once mirrors have begun to be formed on a substrate, information provided by a system 200 according to the present invention may be used to deposit a different material for a portion of a mirror than used previously. Alternatively, the deposition process for that material may be altered, as well as other facets of the manufacturing process, to achieve the desired results. Of course, once the manufacturing process has been altered in accordance with the verification information provided by the system 200, the characterization process may be repeated to confirm altered manufacturing process has produced a desirable product. Thus, by repeating this alteration and verification process, the present invention also provides a novel method of manufacturing MEMS devices, such as the MEMS mirrors 210, 220, 230, 240 illustrated in FIG. 2.

To provide a more complete understanding of how the mirrors 210, 220, 230, 240 in the mirror array 260 may be characterized using the present invention, a method of testing, or characterizing, the mirrors 210, 220, 230, 240 using the system 200 illustrated in FIG. 2 will now be described in greater detail. Before characterization begins, a voltage is first applied to the mirror array 260. This applied voltage, for example, 50 volts, causes the mirrors 210, 220, 230, 240 to tilt to their respective deflection angles $A_1$, $A_2$, $A_3$, $A_4$. Then, as the interferometer 270 applies the beam 280 to the mirror array 260, the deflection angles $A_1$, $A_2$, $A_3$, $A_4$ of each of the mirrors 210, 220, 230, 240 cause the beam 280 to reflect back to the interferometer 270 at a particular angle. The interferometer 270 is then able to simultaneously determine the precise deflection angle $A_1$, $A_2$, $A_3$, $A_4$ of each of the mirrors 210, 220, 230, 240. Those skilled in the pertinent art will understand the function and accuracy of the various available interferometers, and how they can use an interferometer to achieve precise topographic measurements; thus, that discussion will not be presented here.

In the illustrated embodiment, by simultaneously deflecting the beam 280 off all the mirrors 210, 220, 230, 240, the interferometer 270 may be used to determine that the first, second and fourth mirrors 210, 220, 240 have substantially the same deflection angle $A_1$, $A_2$, $A_4$ for the voltage being applied. In addition, the interferometer 270 further can be used to determine that the third mirror 230 has a deflection angle $A_3$ that is not substantially equal to the other mirrors 210, 220, 240 being simultaneously characterized. As a result of the unequal angle $A_3$, the manufacturing process may be altered to produce uniform MEMS devices, such as the mirror array 260, such that when a given voltage is applied, the individual components comprising the mirror array 260 respond or perform in a similar manner consistent with design specifications. In addition, the information simultaneously gathered by the interferometer 270 is used to determine whether the angles $A_1$, $A_2$, $A_3$, $A_4$ are within specified tolerances, so that the manufacturing process may also be altered accordingly. In one embodiment, a strict tolerance of about 0.1° may be kept on the deflection angles $A_1, A_2, A_3, A_4$. Of course, in other embodiments, the tolerance may be 1° or more, or alternatively, at a more stringent tolerance of less than about 0.1°.

In an advantageous embodiment, this characterization process is repeated for incremented applied voltages. In an exemplary embodiment, the voltage is incremented by about 10 volts. However, other increments are also within the broad scope of the present invention. Preferably, the voltage is incremented such that the mirrors 210, 220, 230, 240 tilt about one degree, in either direction, from their previous deflection angle $A_1, A_2, A_3, A_4$, however, other increments in tilt may also be used. The interferometer 270 is then again simultaneously used on all the mirrors to verify whether the deflection angles $A_1, A_2, A_3, A_4$ are substantially equal to one another and within the specified tolerances. The process is then repeated to simultaneously verify the deflection angles $A_1, A_2, A_3, A_4$ for each increment of applied voltage throughout the entire range of movement for all the mirrors 210, 220, 230, 240 in the array 260.

If the mirror array 260 is only one of several arrays, the process may then be repeated for each array within the optical switch. In such an embodiment, all the mirrors in one array will be simultaneously stepped through their entire range of motion, thus simultaneously verifying all the mirrors in the array at each increment, before the process moves to another array within the switch. Alternatively, the interferometer 270 may verify the accuracy of deflection angles for all the mirrors in all the arrays within the switch at a single applied voltage, before incrementing the applied voltage to tilt all the mirrors in the switch. Thus, the accuracy of deflection angles would be verified for all of the mirrors in the optical switch for a single applied voltage of, for example, 50 volts, before the voltage is incremented and the process repeated across all the arrays of the switch. Regardless of the approach used, a mirror characterization system according to the present invention is capable of simultaneously verifying the deflection angles as a function of applied voltages for multiple MEMS mirrors, rather than individually characterizing each mirror as is done in the prior art.

By simultaneously characterizing multiple mirrors at one time rather than individually, characterization of an optical switch may be accomplished in a fraction of the time required by methods found in the prior art. For example, where prior art characterization methods require about 12 days, working 24 hours per day, to characterize an optical switch having 1024 mirrors, a characterization system according to the present invention could complete the task in about one day. Those skilled in the art understand that a reduction in the time required for characterization directly translates into significant cost savings in the manufacturing process. In addition, by generating such topographic information of an entire mirror array using the system 200 of the present invention, a topographic plot may be created in accordance with the principles of the present invention to provide visual data regarding deflection angles and applied voltages not found in prior art techniques.

Figure 3:
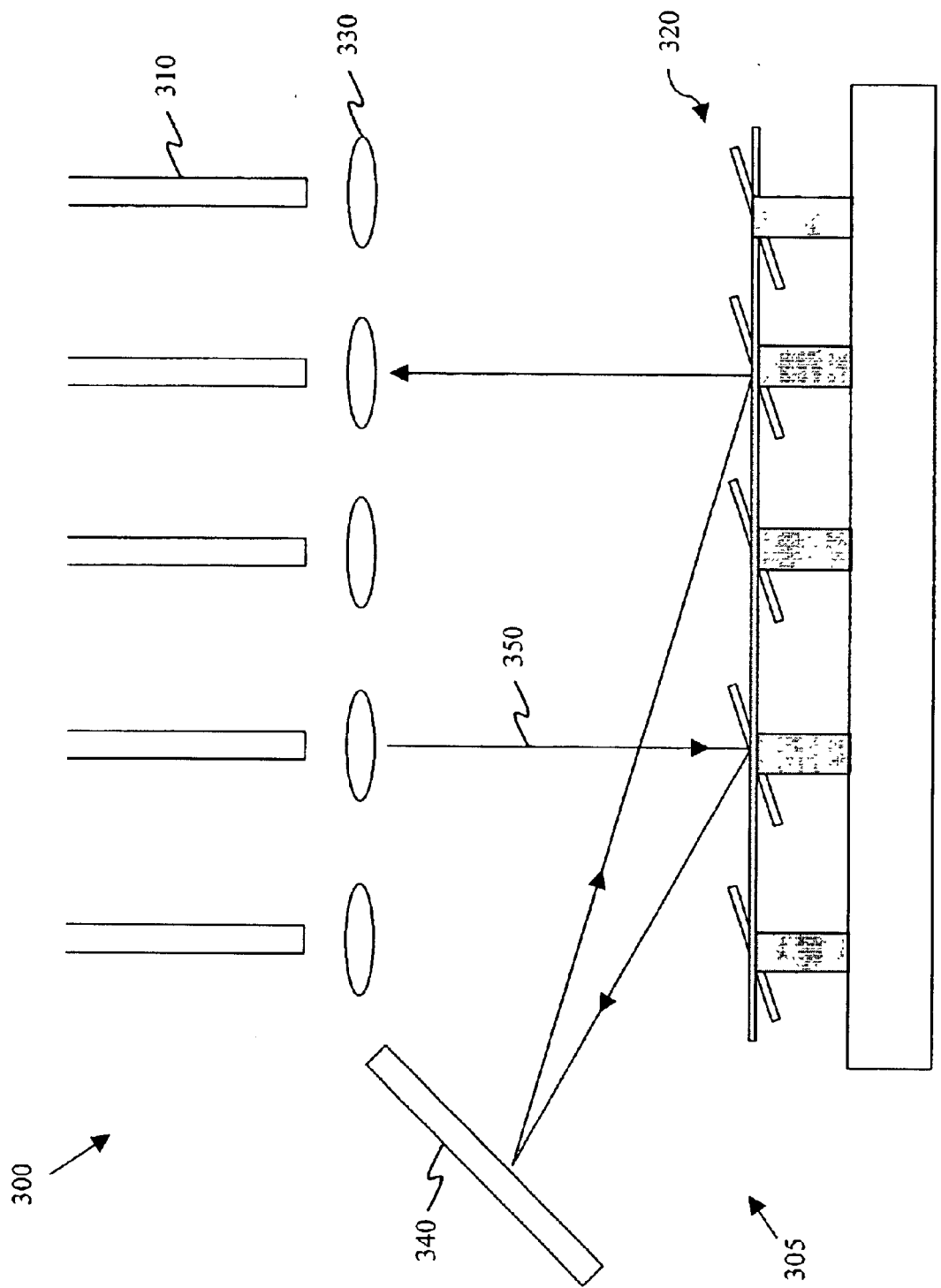
FIG. 3 illustrates a schematic view of an optical communications system which may provide an environment for an optical switch characterized in accordance with the present invention.

Referring finally to FIG. 3, illustrated is an optical communications system 300 that may employ an optical switch 305 characterized according to principles of the present invention. In the embodiment illustrated in FIG. 3, the optical communications system 300 includes input/output fiber bundles 310 and a MEMS mirror array 320 that may also be characterized according to the present invention. In addition, imaging lenses 330 are interposed between the input/output fiber bundles 310 and the MEMS mirror array 320. A reflector 340 for redirecting optical signals is also illustrated. The optical communications system 300 represents an optical cross-connect, which is one environment where the MEMS mirror array 320 may be used.

In accordance with conventional practices, an optical signal 350 from one of the input fibers of the fiber bundle 310 is reflected off a mirror in the array 320 onto the reflector 340. The mirror in the array 320 is electrically controlled to reflect the optical signal 350 to another mirror in the array 320, which is also electrically controlled to reflect the optical signal 350 to one of the output fibers of fiber bundle 310 to complete the optical switching. In alternative embodiments, the input/output fiber bundles 310 are located in separate arrays, and multiple mirror arrays are used to perform the cross-connect function.

Of course, use of the characterization system, and related methods, of the present invention is not limited to the particular optical communications system 300 illustrated in FIG. 3. In fact, the present invention is broad enough to encompass any type of optoelectronic communications system which would benefit from the faster and more accurate characterization provided by the present invention. In addition, the present invention is broad enough to encompass optical communications systems having greater or fewer components than illustrated in FIG. 3. Beneficially, each time the principles of the present invention are employed to characterize some or all of the MEMS mirrors in an optical switch, manufacturing costs may be eliminated from the overall manufacturing process due to the reduced number of characterization steps required.

Although the present invention has been described in detail, those skilled in the art should understand that they can make various changes, substitutions and alterations herein without departing from the spirit and scope of the invention in its broadest form.

What is claimed is:

1. A method of testing micro-electrical mechanical devices, located on a substrate, comprising:

simultaneously applying a voltage to each of a plurality of micro-electrical mechanical mirrors to tilt each of the plurality to a deflection angle; and simultaneously deflecting a beam from each of the plurality to simultaneously using an interferometer to determine an accuracy of the deflection angle of each of the plurality.

2. The method as recited in claim 1 wherein simultaneously applying a voltage includes simultaneously applying a voltage to each of a plurality of micro-electrical mechanical mirrors comprising one of a plurality of mirror arrays located in an optoelectronic switch.

3. The method as recited in claim 1 wherein simultaneously determining includes simultaneously determining an accuracy of the deflection angle of each of the plurality within a range of about 0.1° to about 1° of the deflection angle.

4. The method as recited in claim 1 wherein simultaneously applying a voltage includes simultaneously applying a voltage ranging from about 50 volts to about 150 volts.

5. The method as recited in claim 1 further including simultaneously deflecting a beam from each of the plurality to simultaneously determine the voltage applied to each of the plurality.

6. A method of manufacturing micro-electrical mechanical devices, comprising;

constructing a plurality of micro-electrical mechanical mirrors on a substrate; and testing each of the plurality, including:

simultaneously applying a voltage to each of a plurality of micro-electrical mechanical mirrors to tilt each of the plurality to a deflection angle; and simultaneously deflecting a beam from each of the plurality using an interferometer to simultaneously determine an accuracy of the deflection angle of each of the plurality.

7. The method as recited in claim 6 wherein simultaneously applying a voltage includes simultaneously applying a voltage to each of a plurality of micro-electrical mechanical mirrors comprising one of a plurality of mirror arrays located in an optoelectronic switch.

8. The method as recited in claim 6 wherein simultaneously determining includes simultaneously determining an accuracy of the deflection angle of each of the plurality within a range of about 0.1° to about 1° of the deflection angle.

9. The method as recited in claim 6 wherein simultaneously applying a voltage includes simultaneously applying a voltage ranging from about 50 volts to about 150 volts.

10. The method as recited in claim 6 further including simultaneously deflecting a beam from each of the plurality to simultaneously determine the voltage applied to each of the plurality.

* * * * *